United States Patent [19]

Furia

[11] 4,113,271
[45] Sep. 12, 1978

[54] FOLDING ATTACHMENT FOR BICYCLES

[76] Inventor: Arnold Furia, Wedgewood Apts. E-35, New Hartford, N.Y. 13413

[21] Appl. No.: 774,526

[22] Filed: Mar. 4, 1977

[51] Int. Cl.² .............................................. B62K 15/00
[52] U.S. Cl. ...................................... 280/287; 403/92
[58] Field of Search ...................... 280/278, 287, 87.05, 280/209; 403/92

[56] References Cited

U.S. PATENT DOCUMENTS

| | | | |
|---|---|---|---|
| 1,584,314 | 5/1926 | Mamiya | 280/278 |
| 3,074,741 | 1/1963 | Rutkove | 280/278 |
| 3,215,459 | 11/1965 | Baldwin | 280/287 X |
| 3,259,399 | 7/1966 | Silbereis | 280/287 |
| 3,791,672 | 2/1974 | Pera | 280/287 |
| 3,807,762 | 4/1974 | Ogisu | 280/287 |
| 3,883,157 | 5/1975 | Simpkins | 280/287 |

FOREIGN PATENT DOCUMENTS 96,805  6/1921  Switzerland ............................. 280/287

*Primary Examiner*—Kenneth H. Betts
*Attorney, Agent, or Firm*—Charles S. McGuire

[57] ABSTRACT

An attachment for a standard bicycle which is installed by cutting the bicycle frame members in a substantially vertical plane and rigidly attaching a pair of hingedly connected bars to the cut ends. The bars may be welded to the bicycle frame members, or affixed at their ends to tubular members which are bolted or otherwise attached to the front and rear portions of the bicycle frame members. Movement about the hinged connection selectively places the bicycle either in the standard riding position or in a folded position with the front and rear wheels side-by-side.

4 Claims, 7 Drawing Figures

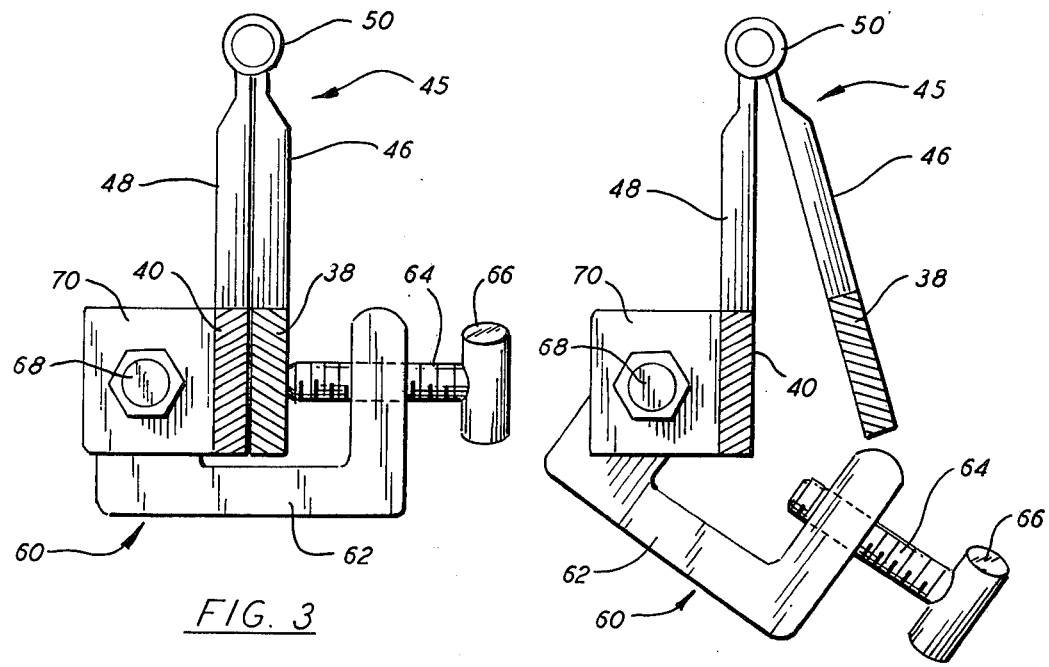
FIG. 3
FIG. 4
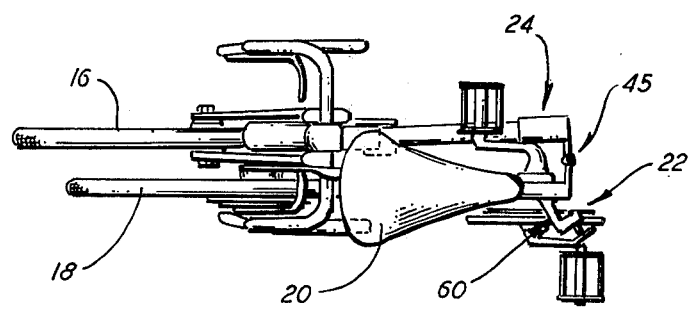
FIG. 5

FOLDING ATTACHMENT FOR BICYCLES

BACKGROUND OF THE INVENTION

The present invention relates to folding bicycles and, more specifically, to an attachment for converting a standard bicycle to a foldable bicycle.

For ease of storage or transportability it is often desirable to be able to place a bicycle in a more compact space then it normally occupies. One way of accomplishing this is to provide means for folding the bicycle about a vertical axis somewhere near its center to bring the front and rear wheels into essentially side-by-side relation. Although bicycles have in the past been provided with such folding means, the only practical manner of incorporation thereof in the bicycle structure is to include the folding means in the bicycle as originally manufactured. The hinges, or other pivotal attachment means, are normally associated directly with the bicycle frame members, requiring welding or similar operations on portions of the bicycle itself.

It is a principal object of the present invention to provide means for converting a standard bicycle to a folding bicycle without substantial mechanical operations.

A further object is to provide a relatively simple and economical, yet rugged and durable structure for attachment to a standard bicycle to permit folding thereof to a compact position for transportion or storage.

An additional object is to provide structure which may be fabricated separately from, for installation in a rapid and simple manner upon, an existing bicycle to convert the latter from a standard to a folding-type bicycle.

Other objects will in part be obvious and will in part appear hereinafter.

SUMMARY OF THE INVENTION

In accordance with the foregoing objects, the attachment is fabricated entirely apart from the bicycle upon which it is to be installed, and includes a pair of elongated bars. Hinge means connect the bars to one another in parallel relation for folding movement about an axis parallel to and adjacent a side edge of the bars. The attachment is installed on a bicycle by fixedly attaching opposite ends of both bars to upper and lower frame members of the bicycle at or near the longitudinal midpoint thereof. The frame members are severed between the connections thereto of the two bars.

Although opposite ends of the bars may be welded to the frame members, it is preferred that installation of the attachment be performed by the consumer with readily available hand tools. In the illustrated embodiment, a tubular member is affixed to each end of the two bars. The tubular members are fixedly attached to the severed ends of the bicycle frame members, either before or after they are cut to divide the bicycle into front and rear sections. The tubular members may be attached to the frame members by means of a suitable epoxy cement, in which case the only tool required for converting the bicycle from standard to folding is a hack saw for cutting the frame members. Alternatively, and as described herein, the tubular members may be bolted to the frame members, in which case a drill is also required to provide holes in the frame members for passage of the bolts.

When the attachment is mounted on the bicycle in the manner described, movement about the hinged connection places the front and rear sections of the bicycle either in their usual positions when the frame is uncut, or in a folded position with the front and rear wheels in essentially side-by-side relation.

Clamping means are provided for selectively fixing the attachment with the bicycle in the erected position. The clamping means are manually released to allow movement of the bicycle to the folded position. One form of the attachment provides for selective adjustment of the length of the connecting bars so that the same attachment may be used for different sizes of bicycles. The configuration of the attachment may easily be adapted to either boys' or girls' bicycles so long as two spaced frame members connect the front and rear sections of the bicycle.

BRIEF DESCRIPTION OF THE DRAWINGS

FIGS. 3 and 4 are enlarged plan views in section on the line 3—3 of FIG. 2, showing the clamping means in the engaged and disengaged positions respectively;

FIG. 5 is a plan view of the bicycle of FIG. 1 in the folded position;

DETAILED DESCRIPTION

Figure 1:
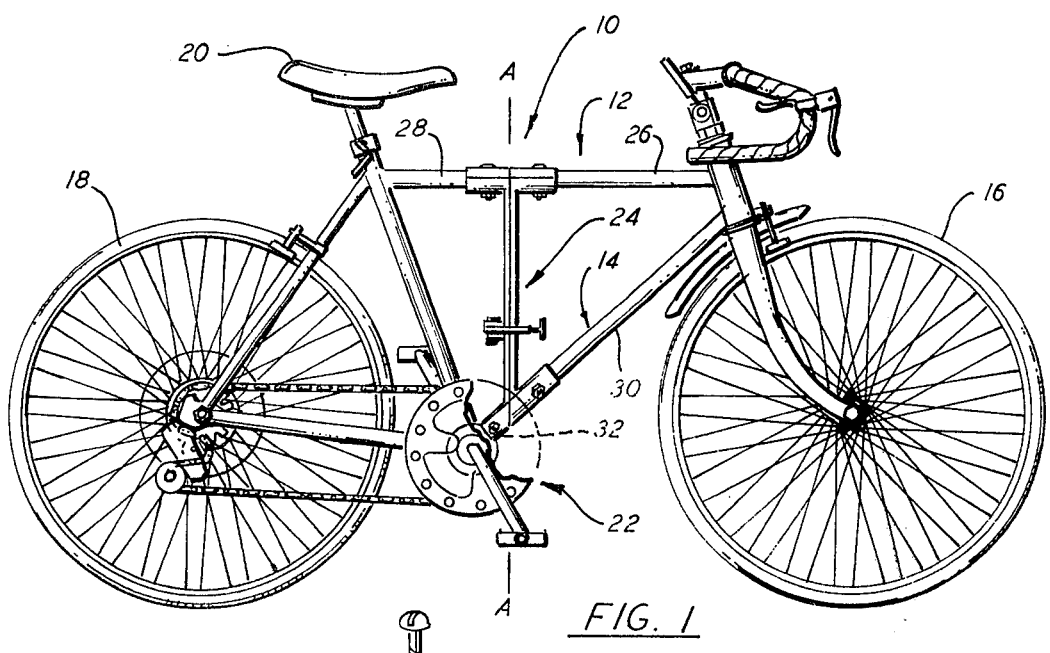
FIG. 1 is a side elevational view of a conventional boys' bicycle with the attachment of the invention mounted thereon.

Referring now to the drawings, in FIG. 1 is shown a bicycle, generally denoted by reference numeral 10, having upper and lower frame members 12 and 14, respectively, connecting the forward and rear sections in the usual fashion. Constructional details of bicycle 10 are conventional in all respects and form no part of the present invention, except that the bicycle must have two, spaced frame members extending in a single plane between its front and rear sections, as virtually all standard bicycles do. Bicycle 10 includes front and rear wheels 16 and 18, respectively, seat 20 and pedal and sprocket assembly 22.

The attachment of the present invention is generally denoted in FIG. 1 by reference numeral 24. It is attached to bicycle 10, which is divided into separate front and rear sections by cutting upper and lower frame members 12 and 14 in a vertical plane denoted by line A—A, transverse to the plane in which the frame members lie, approximately at the mid-point of the bicycle. Upper frame member 12 is thus divided into front and rear portions 26 and 28, lower frame member 14 being divided into front and rear portions 30 and 32, the latter being immediately adjacent the hub of pedal assembly 22 and covered in FIG. 1 by a portion of attachment 24.

Figure 2:
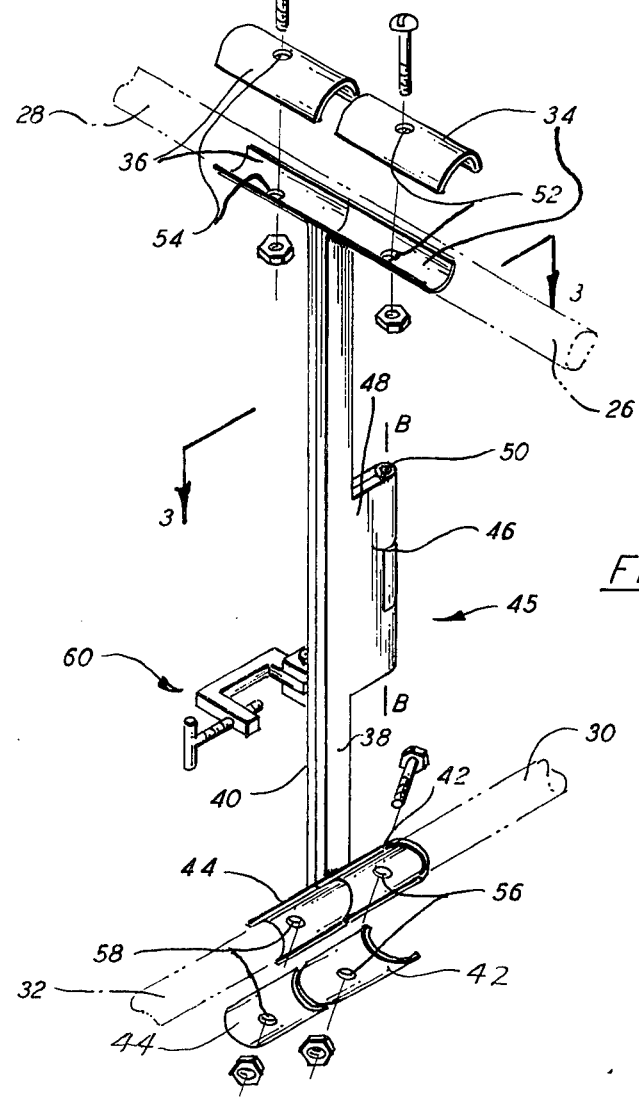
FIG. 2 is a perspective view of one configuration of the attachment, showing fragments of the bicycle frame.

Constructional details of attachment 24 are shown more clearly in FIG. 2. First and second upper tubular sections 34 and 36 are in the form of hollow cylinders, axially divided into two semi-circular halves, having inside diameters greater, but preferably only slightly greater, than the outside diameter of upper frame member 12, which is also tubular in form. The lower halves of first and second upper tubular sections 34 and 36 are fixedly secured, e.g., by welding, to the ends of first and second flat connecting bars 38 and 40, respectively. First and second lower tubular sections 42 and 44 are likewise split axially into two parts, one part of each being affixed to the opposite ends of connecting bars 38 and 40, respectively.

Hinge means 45 includes plates 46 and 48 which are fixedly attached to, or formed integrally with, connecting bars 38 and 40, respectively. Pin 50 connects plates 46 and 48 in the usual manner for movement about the axis denoted in FIG. 2 by line B—B. The elements are dimensioned and arranged so that placing the hinged connection in the position of FIG. 2 places connecting bars 38 and 40 in mutual contact, and the abutting ends of upper tubular sections 34 and 36, and lower tubular sections 42 and 44 are also in contact. In this position, upper tubular sections 34 and 36 are coaxially arranged, as are lower tubular sections 42 and 44. Hinge means 45 could, of course, be in the form of a piano-type hinge running along all or a substantial portion of edges of bars 38 and 40, or could constitute some other appropriate folding connection.

Since the upper frame member, or crossbar, is horizontal and the lower frame member is diagonal on most conventional bicycles, it would not be possible to assemble the attachment with severed ends of the frame members if both the upper and lower tubular sections of the attachment were fully cylindrical. That is, there would be an interference preventing telescoping movement of the frame ends into the tubular sections. Thus, either the upper or lower tubular sections must be axially divided in the manner illustrated, or some similar way, in order to effect the required assembly. In the construction of FIG. 2, all of the tubular sections are so divided, while in a later described construction, only the lower tubular members are axially divided.

The FIG. 2 construction of the attachment may be assembled with the bicycle before cutting the upper and lower frame members thereof. The portions of tubular sections 34 and 36 which are attached to connecting bars 38 and 40 are placed in contact with upper frame member 12, and the attached portions of lower tubular sections 42 and 44 are placed in contact with lower frame member 14. The separate portions of each tubular section are then placed on the opposite side of the corresponding frame member and attachment 24 is then secured to bicycle 10. This may be effected in a satisfactory manner with currently available, strong holding, epoxy glue or cement. Alternatively, attachment 24 may be secured by bolting the tubular sections to the bicycle frame members. For this purpose, openings 52 and 54 are provided in each portion of tubular sections 34 and 36, respectively, and corresponding holes are drilled in upper frame member 12. Openings 56 and 58 are likewise provided in each portion of lower tubular sections 42 and 44, respectively, and holes in registration therewith are drilled in lower frame member 14.

By assembling attachment 24 with bicycle 10 while the latter is still in one piece, the division lines between tubular sections 34 and 36 provide a convenient guide for a saw blade in cutting upper frame member 12 into front and rear sections 26 and 28. The same applies, of course, to tubular sections 42 and 44 with respect to lower frame member 14. Also, where holes are to be drilled through the frame members, the pre-drilled openings in the tubular sections insure that the holes will be in proper registration. Thus, upon assembly of attachment 24 with bicycle 10 and cutting upper and lower frame members 12 and 14, conversion of the bicycle frame standard to folding type has been effected.

Clamping means 60 are provided for releasably securing the attachment in the position of FIG. 2, i.e., with the upper and lower frame portion of the bicycle in axial alignment, as before they are cut. An exemplary form of construction and operation of the clamping means is shown in FIGS. 3 and 4. The clamping means include C-shaped member 62, one leg of which is provided with a threaded opening for screw member 64, having manually engageable handle 66. The other leg of member 62 is attached by bolt or pin 68 to bracket 70, which is fixedly attached to bar 40, for freely pivotal movement wth respect thereto. With hinge means 45 in the folded position of FIG. 3, clamping means 60 may be positioned with the two legs of C-shaped member 62 on opposite sides of bars 38 and 40. Screw 64 is advanced to engage the end thereof with bar 38, thereby firmly clamping bars 38 and 40 together and maintaining bicycle 10 in its normal, erected position for riding. When it is desired to move the bicycle to its folded position, screw 64 is retracted a suitable distance to allow member 62 to be rotated about pin 68, as shown in FIG. 4, to allow unfolding movement of hinge means 45. This movement is continued until front wheel 16 is substantially side-by-side with rear wheel 18, as shown in FIG. 5, with bicycle 10 occupying approximately one-half of its original length.

Figure 6:
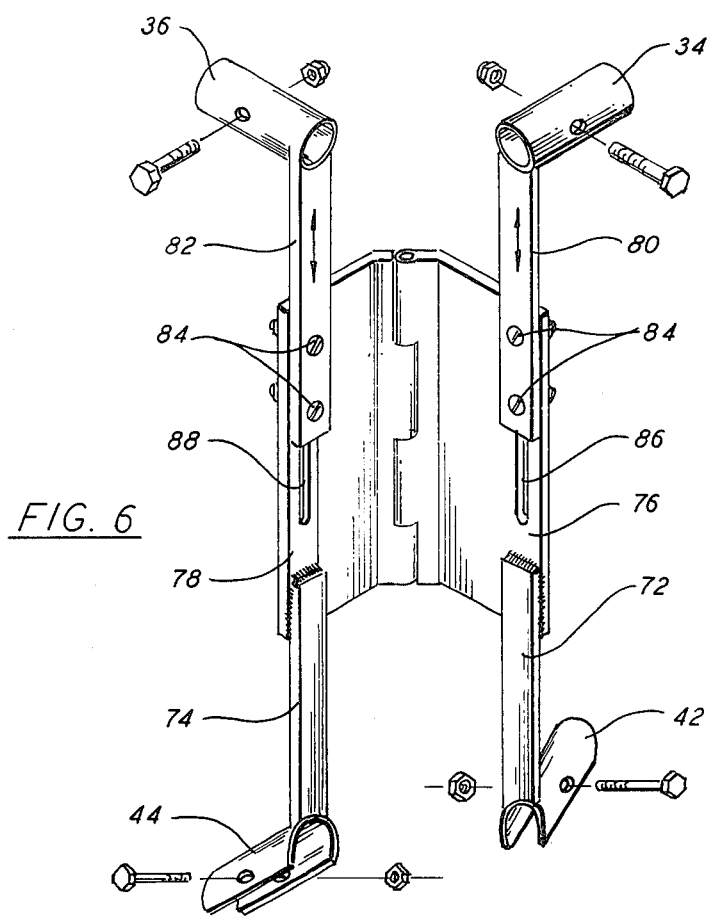
FIG. 6 is a perspective view of another construction of the attachment.

In FIG. 6 is shown a construction which permits adjustment to fit bicycles of different sizes. The same reference numerals are used for both the upper and lower tubular members of the attachment since these may be the same as in the previously described construction. The bars connecting the upper and lower tubular members are divided into two sections each. Lower sections 72 and 74 are fixedly connected (e.g., welded) to hinge plates 76 and 78, respectively. Upper sections 80 and 82 each include openings for receiving bolts 84, which pass through elongated slots in hinge plates 76 and 78, respectively, only the lower ends of the slots being visible and denoted by reference numerals 86 and 88. Bolts 84 are secured by nuts on the opposite sides of the hinge plates and may be tightened to fix the distance between the upper and lower tubular members to correspond to the spacing of the upper and lower frame members of the bicycle upon which the attachment is to be installed.

Figure 7:
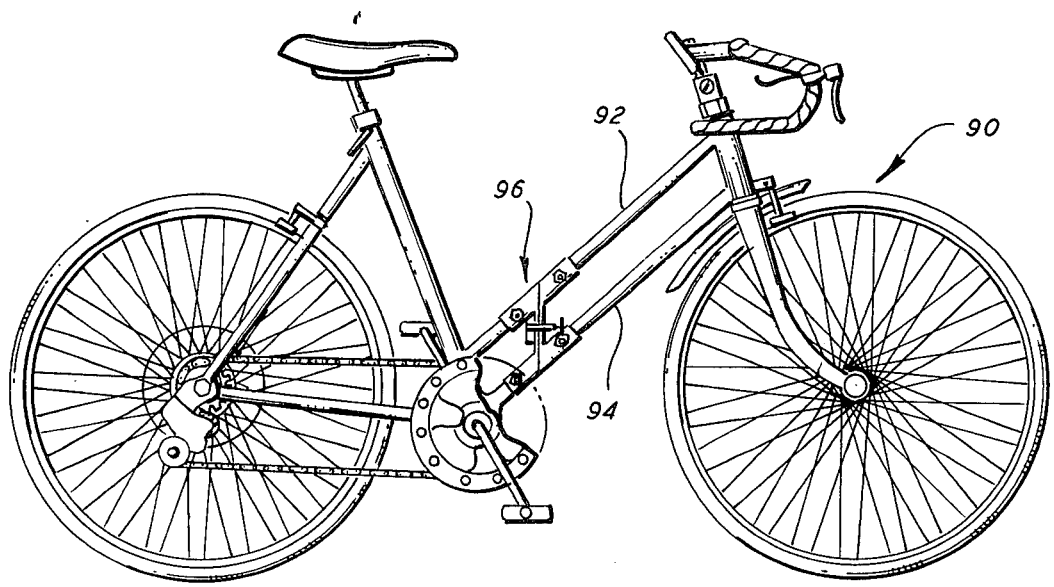
FIG. 7 is an elevational view of a standard form of girls' bicycle showing an appropriate construction of the attachment of the invention mounted thereon.

In FIG. 7 is shown a standard form of girls' bicycle 90 having two parallel, diagonally disposed, forward frame members 92 and 94. Attachment 96 includes first and second upper and lower tubular members, affixed to opposite ends of a pair of connecting bars, in the same manner as attachment 24. In this case, however, all tubular members may be cylindrical since the upper and lower frame members are parallel and therefore are inserted along the same axis into the respective tubular members. Releasable clamping means are provided, as in the previous construction, and movement of bicycle 90 between the folded and erected positions is the same as that of bicycle 10.

The attachment of the invention is, of course, subject to many modifications. For example, the form and number of hinge means used for pivotally connecting the 3 connecting bars may be varied considerably, as may the clamping means. Connecting bars 38 and 40, although shown in the form of flat bars, could be of other cross-sectional configurations. For example, a hollow tubular member of essentially the same dimensions as the bicycle frame members could be split axially to provide the two connecting bars.

What is claimed is:

1. An attachment for converting a standard bicycle to a foldable bicycle by cutting the upper, horizontal, tubular frame member and the lower, diagonal, tubular frame member in a plane parallel to the wheel axes, thereby providing separate front and rear portions each having upper and lower frame end portions, said attachment comprising:
   (a) first and second elongated, flat connecting bars each having a length substantially equal to the distance between said upper and lower frame end portions;
   (b) hinge means connecting said bars to one another for relative movement about an axis parallel to the length thereof and spaced laterally therefrom;
   (c) first and second semi-cylindrical members extending rigidly from the upper ends of said first and second bars, respectively, along axes perpendicular to the length thereof;
   (d) third and fourth semi-cylindrical members extending rigidly from the lower ends of said first and second bars, respectively, along axes arranged at an angle with respect to the length of said bars equal to the angle of the axis of said diagonal frame member with the vertical; and
   (e) each of said semi-cylindrical members having at least one opening therethrough and having an inside diameter substantially equal to the outside diameter of said frame end portions, whereby the latter may be placed in contact with each of said semi-cylindrical members and attached thereto by means of bolts extending through said openings in said semi-cylindrical members and registering openings in said frame end portions.

2. The invention according to claim 1 and further including fifth, sixth, seventh and eighth semi-cylindrical members each having a diameter and length corresponding to said first, second, third and fourth semi-cylindrical members, respectively, and each having at least one opening therethrough, whereby said fifth, sixth, seventh and eighth semi-cylindrical members may be placed in mating relationship with said first, second, third and fourth semi-cylindrical members, respectively, to completely enclose said frame end portions and attached thereto.

3. The invention according to claim 2 and further including releasable clamp means for selectively securing said bars in a position of relative movement about said hinge axis wherein said first and second members and said third and fourth members are in respective axial alignment.

4. An attachment for converting a standard bicycle to a foldable bicycle, said attachment comprising, in combination:
   (a) first and second upper, tubular sections;
   (b) first and second lower, tubular sections;
   (c) first and second rigid connecting bars of substantially equal length;
   (d) said first upper and lower tubular sections being fixedly secured to opposite ends of said first bar;
   (e) said second upper and lower tubular sections being fixedly secured to opposite ends of said second bar;
   (f) means for attaching each of said upper and lower tubular sections to front and rear portions, respectively, of a pair of spaced bicycle frame members;
   (g) hinge means connecting said first and second bars to one another for movement about an axis parallel with the major dimension thereof between a first position, wherein said upper and lower tubular sections are respectively in coaxial, end-to-end, abutting relation, and a second position, wherein said upper and lower tubular sections are respectively in substantially side-by-side relationship;
   (h) clamping means structurally associated with said bars for selectively fixing the latter in said first position; and
   (i) means for selectively adjusting the length of said bars, and thereby the spacing of said upper from said lower tubular sections.

* * * * *